United States Patent
Fritz et al.

(10) Patent No.: US 9,875,142 B2
(45) Date of Patent: Jan. 23, 2018

(54) SYSTEM AND METHOD FOR EFFICIENT TASK SCHEDULING IN HETEROGENEOUS, DISTRIBUTED COMPUTE INFRASTRUCTURES VIA PERVASIVE DIAGNOSIS

(71) Applicant: Palo Alto Research Center Incorporated, Palo Alto, CA (US)

(72) Inventors: Christian Fritz, Menlo Park, CA (US); Shekhar Gupta, Mountain View, CA (US); Johan de Kleer, Los Altos, CA (US); Robert R. Price, Palo Alto, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 304 days.

(21) Appl. No.: 13/848,934

(22) Filed: Mar. 22, 2013

(65) Prior Publication Data
US 2014/0289733 A1   Sep. 25, 2014

(51) Int. Cl.
*G06F 9/50* (2006.01)
*G06F 9/46* (2006.01)

(52) U.S. Cl.
CPC ...... *G06F 9/5066* (2013.01); *G06F 2209/508* (2013.01)

(58) Field of Classification Search
None
See application file for complete search history.

(56) References Cited

U.S. PATENT DOCUMENTS

| | | | | |
|---|---|---|---|---|
| 5,909,578 A | * | 6/1999 | Buzbee | G06F 11/3466 714/E11.2 |
| 2008/0066070 A1 | * | 3/2008 | Markov | G06F 9/4818 718/103 |
| 2010/0083248 A1 | * | 4/2010 | Wood | G06F 9/5077 718/1 |
| 2010/0235349 A1 | * | 9/2010 | Kuno | G06F 17/30306 707/718 |
| 2012/0096473 A1 | * | 4/2012 | Durham | G06F 9/5077 718/105 |
| 2012/0266176 A1 | * | 10/2012 | Vojnovic et al. | 718/104 |
| 2013/0104140 A1 | * | 4/2013 | Meng et al. | 718/104 |

(Continued)

OTHER PUBLICATIONS

Abhishek Verma; ARIA: Automatic Resource Inference and Allocation for MapReduce Environments; pp. 235-244; Copyright 2011 ACM.*

(Continued)

*Primary Examiner* — Eric C Wai
(74) *Attorney, Agent, or Firm* — Fay Sharpe LLP

(57) ABSTRACT

A system and method schedules jobs in a cluster of compute nodes. A job with an unknown resource requirement profile is received. The job includes a plurality of tasks. Execution of some of the plurality of tasks is scheduled on compute nodes of the cluster with differing capability profiles. Timing information regarding execution time of the scheduled tasks is received. A resource requirement profile for the job is inferred based on the received timing information and the differing capability profiles. Execution of remaining tasks of the job is scheduled on the compute nodes of the cluster using the resource requirement profile.

23 Claims, 6 Drawing Sheets

(56) References Cited

U.S. PATENT DOCUMENTS

| | | | |
|---|---|---|---|
| 2014/0089727 A1* | 3/2014 | Cherkasova et al. | 714/6.13 |
| 2014/0215471 A1* | 7/2014 | Cherkasova | G06F 11/3428 718/102 |
| 2014/0215487 A1* | 7/2014 | Cherkasova et al. | 718/106 |

OTHER PUBLICATIONS

Shekhar Gupta; Diagnosing Heterogeneous Hadoop Clusters; 23rd International Workshop on the Principles of Diagnosis (DX2012) Jul. 31, 2012; pp. 1-8.*

Koichi Shirahata; Hybrid Map Task Scheduling for GPU-based Heterogeneous Clusters; IEEE 2010; pp. 733-740.*

Aggarwal, Sonali, et al., "Characterization of Hadoop Jobs using Unsupervised Learning", 2nd IEEE International Conference on Cloud Computing Technology and Science, IEEE, 2010, p. 748-753.

Balakrishnan, Saisanthosh, et al., "The Impact of Performance Asymmetry in Emerging Multicore Architectures", IEEE, 2005.

Cherkasova, Ludmila, et al., "Session-Based Admission Control: A Mechanism for Peak Load Management of Commercial Web Sites", IEEE Transactions on Computers, vol. 51, No. 6, Jun. 2002, p. 669-685.

Dean, Jeffrey, et al., "MapReduce: Simplified Data Processing on Large Clusters", USENIX Association OSDI '04: 6th Symposium on Operating Systems Design and Implementation, p. 137-149.

Ghemawat, Sanjay, et al., "The Google File System", SOSP'03, Oct. 19-22, 2003, New York, 2003.

Ghiasi, Soraya, et al., "Scheduling for Heterogeneous Processors in Server Systems", CF'05, May 4-6, 2005, Italy, 2005, p. 199-210.

Khan, Arijit, et al., "Workload Characterization and Prediction in the Cloud: A Multiple Time Series Approach", p. 1-14.

Kuhn, Lukas, et al., "Pervasive Diagnosis: The Integration of Diagnostic Goals into Production Plans", Association for the Advancement of Artificial Intelligence, 2008, p. 1306-1312.

Kumar, Rakesh, et al., "Heterogeneous Chip Multiprocessors", IEEE, Nov. 2005, p. 32-38.

Mishra, Asit K., et al., "Towards Characterizing Cloud Backend Workloads: Insights from Google Compute Clusters", This work was done while interning at Google during summer 2009.

Pacheo-Sanchez, Sergio, et al., "Markovian Workload Characterization for QoS Prediction in the Cloud", IEEE International Conference on Cloud Computing, Cloud 2011, Washington, D.C., Jul. 2011.

Wang, Feng, et al., "File System Workload Analysis for Large Scale Scientific Computing Applications", This paper was published in the 21st IEEE / 12th NASA Goddard Conference on Mass Storage Systems and Technologies, Apr. 2004, College Park, Maryland.

Zaharia, Matei, et al., "Improving MapReduce Peformance in Heterogeneous Environments", USENIX Association, 8th USENIX Symposium on Operating Systems Design and Implementation, p. 29-42.

Chaloner, Kathryn, et al. "Bayesian Experimental Design: A Review", Statistical Science, 1995, vol. 10, No. 3, 273-304.

* cited by examiner

SYSTEM AND METHOD FOR EFFICIENT TASK SCHEDULING IN HETEROGENEOUS, DISTRIBUTED COMPUTE INFRASTRUCTURES VIA PERVASIVE DIAGNOSIS

BACKGROUND

The present application relates generally to data processing. It finds particular application in conjunction with task scheduling in distributed compute systems using a map-reduce framework, and will be described with particular reference thereto. However, it is to be appreciated that the present application is also amenable to other like applications.

Map-reduce frameworks are a key technology for implementing big data applications. In these frameworks, a computational job is broken down into map and reduce tasks. The tasks are then allocated to a set of nodes (i.e., servers) so the tasks can be done in parallel. A map task processes a data block and generates a result for this block. A reduce task takes all these intermediate mapping results and combines them into the final result of the job.

A popular map-reduce framework is HADOOP. HADOOP comprises a storage solution known as Hadoop Distributed File System (HDFS), which is an open source implementation of the Google File System (GFS). HDFS is able to store large files across several machines, and using MapReduce, such files can be processed in a distributed fashion, moving the computation to the data, rather than the data to the computation. An increasing number of so called "big data" applications, including social network analysis, genome sequencing, and fraud detection in financial transaction data, require horizontally scalable solutions, and have demonstrated the limits of relational databases.

A HADOOP cluster includes a NameNode and many DataNodes (e.g., tens to thousands). When a file is copied into the cluster, it is divided into blocks, for example, of 64 megabytes (MBs). Each block is stored on three or more DataNodes depending on the replication policy of the cluster, as shown in FIG. 1. Once the data is loaded, computational jobs can be executed over it. New jobs are submitted to the NameNode, where map and reduce tasks are scheduled onto the DataNodes, as shown in FIG. 2.

A map task processes one block and generates a result for this block, which gets written back to the storage solution. The NameNode will schedule one map task for each block of the data, and it will do so by selecting one of the three DataNodes that are storing a copy of that block to avoid moving large amounts of data over the network. A reduce task takes all these intermediate mapping results and combines them into the final result of the job.

One challenge with map-reduce frameworks, such as HADOOP, is that most frameworks assume a homogeneous cluster of nodes (i.e., that all compute nodes in the cluster have the same hardware and software configuration) and assign tasks to servers regardless of their capabilities. However, heterogeneous clusters are prevalent. As nodes fail, they are typically replaced with newer hardware. Further, research has shown benefits to heterogeneous clusters, as compared to homogeneous clusters (see, e.g., Saisanthosh Balakrishnan, Ravi Rajwar, Mike Upton, and Konrad Lai. 2005. The Impact of Performance Asymmetry in Emerging Multicore Architectures. In *Proceedings of the 32nd annual international symposium on Computer Architecture* (ISCA '05). IEEE Computer Society; Washington, D.C., USA, 506-517). Intuitively, more specialized hardware can better suit a variety of differing job resource profiles. By failing to account for heterogeneity, known map-reduce frameworks are not able to match jobs to the best compute nodes, consequently compromising global metrics, such as throughput or maximum delay.

Matei Zaharia, Andy Konwinski, Anthony D. Joseph, Randy Katz, and Ion Stoica. 2008. Improving MapReduce performance in heterogeneous environments. In *Proceedings of the 8th USENIX conference on Operating systems design and implementation* (OSDI'08). USENIX Association, Berkeley, Calif., USA, 29-42, investigates scheduling issues in heterogeneous clusters. However, it does not characterize HADOOP jobs, but rather proposes a scheduling strategy that speculatively executes tasks redundantly for tasks that are projected to run longer than any other.

Further, while tasks belonging to the same job are very similar to each other in terms of their individual resource profile. Tasks belonging to different jobs can have very different profiles in terms of their resource requirements, such as the degree to which they heavily utilize a central processing unit (CPU), memory, disk input/output (I/O) or network I/O. Jobs may also have certain service level requirements. Known map-reduce frameworks do not efficiently schedule tasks to satisfy service level requirements while optimally utilizing available resources.

The present application provides a new and improved system and method which overcome the above-referenced problems and others.

BRIEF DESCRIPTION

In accordance with one aspect of the present application, a system for scheduling jobs in a cluster of compute nodes is provided. The system includes at least one processor programmed to receive a job with an unknown resource requirement profile. The job includes a plurality of tasks. Further, the at least one processor is programmed to schedule execution of some of the plurality of tasks on compute nodes of the cluster with differing capability profiles. Timing information regarding execution time of the scheduled tasks is received by the at least one processor. The at least one processor infers a resource requirement profile for the job based on the received timing information and the differing capability profiles. Execution of remaining tasks of the job is scheduled on the compute nodes of the cluster using the resource requirement profile by the at least one processor.

In accordance with another aspect of the present application, a method for scheduling jobs in a cluster of compute nodes is provided. A job with an unknown resource requirement profile is received. The job includes a plurality of tasks. Execution of some of the plurality of tasks is scheduled on compute nodes of the cluster with differing capability profiles. Timing information regarding execution time of the scheduled tasks is received. A resource requirement profile for the job is inferred based on the received timing information and the differing capability profiles. Execution of remaining tasks of the job is scheduled on the compute nodes of the cluster using the resource requirement profile.

In accordance with another aspect of the present application, a map-reduce system for executing jobs is provided. The system includes a plurality of interconnected compute nodes defining a cluster. The plurality of interconnected compute nodes includes a name node and a plurality of data nodes. The name node configured to receive a job with an unknown resource requirement profile. The job includes a plurality of tasks. The name node is further configured to schedule execution of some of the plurality of tasks on data nodes of the cluster with differing capability profiles, receive timing information regarding execution time of the scheduled tasks, infer a resource requirement profile for the job based on the received timing information and the differing capability profiles, and schedule execution of remaining tasks of the job on the data nodes of the cluster using the resource requirement profile.

DETAILED DESCRIPTION

Figure 1:
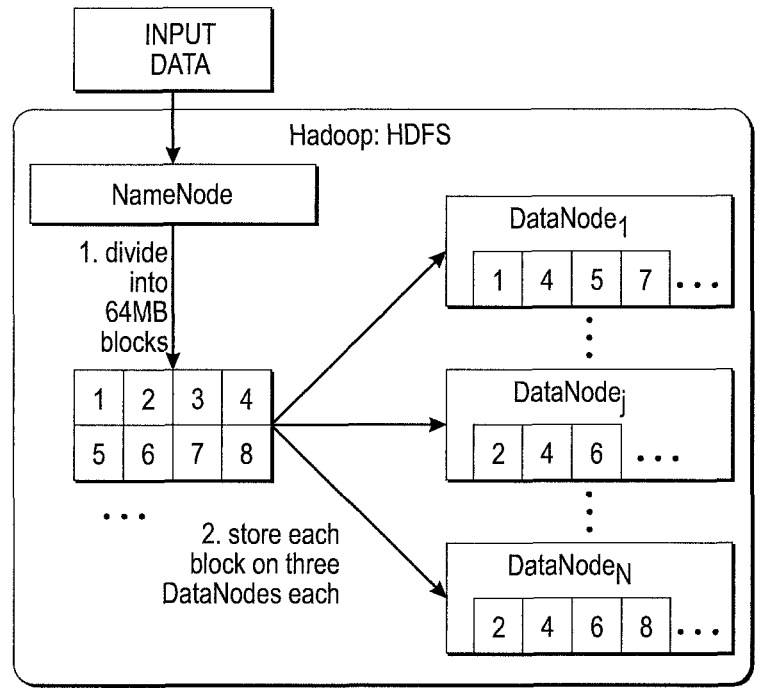
FIG. 1 illustrates the Hadoop Distributed File System (HDFS)

Recognizing that many map-reduce clusters include heterogeneous nodes, the present application proposes an efficient scheduler that matches jobs to compute nodes best suited for the specific needs of the jobs in order to increase the overall throughput. For instance, if a cluster is processing two jobs, one which is very compute intense and one that is reading and writing a lot to disk, then an optimal schedule would be one where the first job's tasks get scheduled on nodes with fast central processing units (CPUs), but slow disks, and the second job's tasks get scheduled on nodes with fast disks, but slow CPUs.

Since machine specific capabilities do not usually change frequently, it is reasonable to assume these to be known. However, a challenge with implementing an efficient scheduler for heterogeneous clusters is that the job specific resource requirements are not known in advance. It is also unreasonable to expect a programmer to estimate and specify them.

The present application proposes an active machine learning approach to determine job resource requirements by determining resource requirements of tasks corresponding to the job. This learning happens during job execution and hence without significant loss in productivity. As input, the learner uses the time it takes to execute a certain task on a specific machine in the cluster. Intuitively, if a job is CPU intensive, the running time of its tasks on nodes that strongly differ in their CPU speed will differ more strongly than between two nodes with the same CPU. This provides information for learning job resource profiles.

Advantageously, the learning can be performed quickly. Namely, the bulk of computational time is taken in the map phase, and usually a job spawns a large number of mapping tasks (in the order of 100s or 1000s, depending on the size of the data). The resource profiles of the first few tasks can be learned, in order to efficiently schedule the later tasks of the same job more efficiently.

To most efficiently learn job resource profiles, a Bayesian experimental design that maximizes the information gained about task requirements can be employed. The experimental design results in a schedule of servers to execute a task on that results in maximum information. The expected time a task will take to complete is modeled on a specific node in the cluster, based on its resource requirements and the node's capabilities. This model is also used to implement a Bayesian update to perform the learning of job resource requirements.

In cloud computing, workload characterization has been studied extensively in the past. However, scope of identifying task resource requirements of the present application is different from the existing work. For example, Asit K. Mishra, Joseph L. Hellerstein, Walfredo Cirne, and Chita R. Das. 2010. Towards characterizing cloud backend workloads: insights from Google compute clusters. *SIGMETRICS Perform. Eval. Rev.* 37, 4 (March 2010), 34-41, describes an approach to workload classification for more efficient scheduling. However, rather than determining the workload characterization explicitly, it merely clusters tasks with similar resource consumptions. In Khan, A.; Xifeng Yan; Shu Tao; Anerousis, N.; "Workload characterization and prediction in the cloud: A multiple time series approach," *Network Operations and Management Symposium (NOMS)*, 2012 *IEEE*, vol., no., pp. 1287-1294, 16-20 Apr. 2012, the authors characterize workloads by identifying repeated patterns and finding groups of servers that frequently exhibit correlated workload patterns. In Sergio Pacheco-Sanchez, Giuliano Casale, Bryan Scotney, Sally McClean, Gerard Parr, and Stephen Dawson. 2011. Markovian Workload Characterization for QoS Prediction in the Cloud. In *Proceedings of the* 2011 *IEEE* 4*th International Conference on Cloud Computing* (CLOUD '11). IEEE Computer Society, Washington, D.C., USA, 147-154, the authors describe workload characterization for quality-of-service (QoS) prediction in web servers. However, the present application characterizes the cluster workload directly in terms of resource usage of jobs. This is done passively (i.e., without injecting code or adding monitoring to computational nodes).

There has also been research on using machine learning for HADOOP task characterization. Sonali Aggarwal, Shashank Phadke, and Milind Bhandarkar. 2010. Characterization of Hadoop Jobs Using Unsupervised Learning. In *Proceedings of the* 2010 *IEEE Second International Conference on Cloud Computing Technology and Science* (CLOUDCOM '10). IEEE Computer Society, Washington, D.C., USA, 748-753, studies an unsupervised learning approach producing clusters of similarly behaving jobs. However, detailed resource requirements are not learned.

In the sections to follow, optimal task allocation is formulated as a Bayesian experimental design problem. Thereafter, a Bayesian experimental design is derived for the task allocation problem and applied to a map-reduce cluster to optimally allocate tasks. The Bayesian experimental design leads to a closed form solution to estimate the expected information gain of executing a task on a server, which can be used to pre-complete the optimal experimental schedule offline and infer job resource profiles. While the Bayesian experimental design supports a variety of requirements, it is illustrated with only CPU and disk I/O usage for the sake of simplicity.

1. Experimental Design Problem

A primary goal of the present application is calculating an optimal task assignment strategy for a heterogeneous mapreduce cluster. Typical optimization problems might be to minimize the total execution time of all concurrently executing jobs, or to ensure some fairness property in terms of longest delay for any one job.

In order to perform the optimization, both the task resource requirements and the server capabilities need to be identified. Server capabilities are difficult to precisely describe. Explicit attributes, such as clock rate, number of cores, cache and memory, disk bandwidth and raid configuration, translate only loosely into performance on any given task. Therefore, probe jobs can be employed to empirically characterize the server capabilities by running explicit experiments. Since the server capabilities are relatively constant over time, these probe jobs only need to be run once. The learned capabilities can then be stored for subsequent use.

In contrast, task requirements, such as total computational load, disk input/output (I/O) required and memory footprint, can vary considerably depending on the exact algorithm and data the task encompasses. Since no prior knowledge about jobs being submitted to the cluster is assumed, tasks belonging to the job must be executed to learn about their resource requirements. Since each job consists of many tasks, all of which can be assumed to have almost identical resource requirements, these requirements can be learned on the first tasks being executed, and then this knowledge can be exploited when scheduling the remaining tasks. This particularly makes sense when the number of tasks is high (e.g., in the thousands).

Performing exhaustive experiments on a task would require more time than would be saved through the optimization process described here. Hence, an active learning based approach to determine the job requirements online during execution is proposed. The intuition is that, by executing tasks belonging to the same job on nodes that differ in resource X, and measuring their respective runtime, information about the tasks' dependence on resource X is gained. This strategy relates to the concept of pervasive diagnosis, described in Lukas Kuhn, Bob Price, Johan De Kleer, Minh Do, and Rong Zhou. 2008. Pervasive diagnosis: the integration of diagnostic goals into production plans. In *Proceedings of the 23rd national conference on Artificial intelligence—Volume* 3 (AAAI'08), Anthony Cohn (Ed.), Vol. 3. AAAI Press 1306-1312. Alternatively, this can be viewed as a Bayesian Experimental Design problem in which prior knowledge about a phenomenon is used to select the next experiment from a set of possible experiments in order to maximize expected utility.

In the context of the present application, the set of possible experiments corresponds to the set of servers a task could be executed on. The outcome of executing task i on server j with capability $k^j$ is the measured execution time $T^{i,j}$. $T^{i,j}$ is assumed to be a normally distributed random variable with a standard deviation $\sigma^j$. Here it is implicitly assumed that every machine has different observation variance. There will be a certain utility associated with learning this outcome $U(T^{i,j}|k^j)$. The expected utility of running task i on server j is the expectation over all possible measured execution times:

$$U^{i,j} = \int_{T^{i,j}} p(T^{i,j}|k^j) U(T^{i,j}, k^j) dT^{i,j}. \quad (1)$$

The server j which maximizes this utility is then selected.

The utility of refining task profiles can ultimately be measured by the increase in value (or reduction in cost) of the schedules that can be created with the more accurate profiles. This calculation, however, is complex and time consuming. Therefore, the utility is approximated by the information gain about the task profile. The task profile and/or requirements of job i are characterized by a set of scalar parameters $\theta^i$.

The current state of information about requirements for task i is captured by a probability distribution $P(\theta^i)$. The observation model for the system (likelihood) gives the relationship between observations and task profile $p(T^{i,j}|\theta^i, k^j, \sigma^j)$. The posterior probability over task requirements represents updated beliefs and can be calculated using Bayes' theorem:

$$p(\theta^i | T^{i,j}, k^j, \sigma^j) = \frac{p(T^{i,j} | \theta^i, k^j, \sigma^j) p(\theta^i)}{\int_{\theta^i} p(T^{i,j} | \theta^i, k^j, \sigma^j) p(\theta^i) d\theta^i}. \quad (2)$$

The information gain between the prior distribution over task parameters and the posterior distribution is measured by the Kullback-Leibler (KL) divergence:

$$D_{KL}(p(\theta^i | T^{i,j}, k^j) \| p(\theta^i)) = \int_{\theta^i} p(\theta^i | T^{i,j}, k^j) \cdot \ln \frac{p(\theta^i | T^{i,j}, k^j)}{p(\theta^i)} d\theta^i. \quad (3)$$

To compute expected information gain before running the actual experiment, the expected value of KL divergence is computed.

$$\int p(T^{i,j}|k^j) D_{KL}(p(\theta^i|T^{i,j}k^j) \| p(\theta^i)) dT^{i,j}. \quad (4)$$

By information theory (see Thomas M. Cover and Joy A. Thomas. *Elements of information theory*. Wiley-Interscience, New York, N.Y., USA, 1991), the expected KL divergence (information gain) is the mutual information between the observation and the task requirements $I(\theta^i;T^{i,j}, k^j)$, which can be expressed in terms of the entropy of the prior minus the entropy of the posterior:

$$I(\theta^i;T^{i,j},k^j) = H(\theta^i) - H(\theta^i|T^{i,j}). \quad (5)$$

The entropy terms can be expressed in terms of the model as follows.

$$H(\theta^i) = -\int_{\theta^i} p(\theta^i) \ln p(\theta^i) d\theta^i \ H(\theta^i|T^{i,j}) = -\int_{T^{i,j}} p(T^{i,j}) (\int_{\theta^i} p(\theta^i|T^{i,j}) \ln p(\theta^i|T^{i,j}) d\theta^i) dT^{i,j} \quad (6)$$

In the present application, a focus is on tasks corresponding to the same job i and hence the task identifier does not change in the rest of the discussion. Therefore, in order to improve the readability while deriving further formulations, the superscript i hereafter is ignored. $\theta^i$ will be written $\theta$ and will be written $T^{i,j}$. However, all the derived formulations are also valid for multiple jobs at the same time.

2. Optimal Task Inference

In the previous section, optimal task allocation was formulated as a Bayesian experimental design problem. In this section, the Bayesian experimental design is derived for the task allocation problem. A particularly simple and elegant closed form result can be derived for a restricted class of task models.

2.1 Task Model

A task model predicts the execution time of a task as a function of its resource requirements profile and the capabilities of the server node it is run on. In MapReduce style computations, map and reduce functions have different computational issues. Map tasks generally work with one data input and compute steadily until they have finished. Reduce tasks can have multiple inputs and will work on whichever inputs are available and block on those that are not. Map tasks therefore have a much more predictable run time. They also usually account for the largest amount of computation. Therefore, the focus is on map tasks in this analysis.

The task resource requirements can be described by a vector $\theta=[\theta_1, \theta_2, \ldots, \theta_N]$. Each component of the vector represents a particular resource requirement, such as computation time, disk I/O, memory, or network bandwidth. The capabilities of the server are described by a corresponding vector $K=[K_1, K_2, \ldots, K_N]$. The task completion time is determined by the ability of the server to supply the needed resources.

A task completion model could become complex in order to account for the complexities of realistic task execution. Here, a simplified model is employed as a starting point for analysis. In the simplified model, the time taken to finish a task on server j, $T^j$, is the sum of the task's resource specific needs, divided by the machine specific capabilities in terms of this resource.

$$T^j = \sum_k \frac{\theta_k}{\kappa_k^j} \quad (7)$$

This model is further reduced to only two resources: CPU time, denoted by c, and disk I/O, denoted by d. This can be expressed as a two-dimensional system with task resource profile $\theta=[\theta_c, \theta_d]$ and server capabilities $k=[k_c, k_d]$. Hence the task duration model is:

$$T^j = \frac{\theta_c}{\kappa_c^j} + \frac{\theta_d}{\kappa_d^j}. \quad (8)$$

The server capabilities, $k_c, k_d$, are learned offline to high precision. They are treated as point valued constants. Since new jobs continually enter the system, their resource profiles are not known apriori. The random variables describing these profiles, $\theta_c, \theta_d$, are assumed to follow a multi-variate Gaussian distribution. The uncertainty about the requirements can therefore be captured by a covariance matrix $\Sigma_{\theta_c, \theta_d}$.

$$[\theta_c, \theta_d] \sim N([\mu_{\theta_c}, \mu_{\theta_d}], \Sigma_{\theta_c, \theta_d}) \quad (9)$$

The observed execution time $T^j$ is assumed to be normally distributed around the value predicted by the task duration model given by Equation (8). The uncertainty is given by a standard deviation $\sigma^j$ associated with the machine.

$$T^j \sim N\left(\frac{\theta_c}{\kappa_c^j} + \frac{\theta_d}{\kappa_d^j}, \sigma^j\right) \quad (10)$$

2.2 Belief Updating

Given a prior belief about the requirements of a task, $P(\theta)$, and the observation of a task execution time $T^j$ of the task on server j, an updated posterior task profile distribution can be obtained via Bayes rule (Equation (2)). This requires a likelihood function to link observations to parameters. For the bivariate CPU and disk usage example, the likelihood has the form:

$$p(T^j | \theta_c, \theta_d; \kappa_c, \kappa_d) = \frac{1}{\sqrt{2\pi}\,\sigma^j} \cdot \exp\frac{\left(T^j - \frac{\theta_c}{\kappa_c^j} - \frac{\theta_d}{\kappa_d^j}\right)^2}{2\sigma^{j2}} \quad (11)$$

Figure 3A:
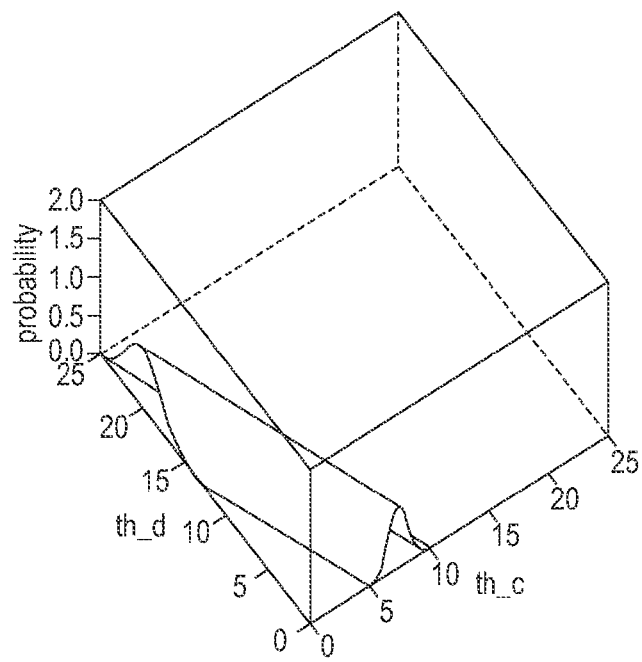
FIG. 3A illustrates a likelihood probability distribution describing possible combinations of computation and disk input/output (I/O) that explain an observed execution time.

Every server is assumed to have a different but constant observation standard deviation $\sigma^j$ that is learned along with the server capabilities $k^j$. The likelihood is essentially a noisy line in parameter space which describes all of the possible mixtures of CPU and disk I/O usage profile of the task that would explain the total observed execution time $T^j$. A notional graphical example appears in FIG. 3A. Note that the density has been truncated at the boundaries of the positive quadrant as resource requirements cannot be negative.

Some insight into the form of the probability density function (PDF) of likelihood is gained by considering its contours (i.e., set of points at which it takes the same value). The contours of the bivariate Gaussian are already known as an ellipse. The shape of the above expression can be inferred by computing the determinant ($b^2-4ac$) of the general form of the likelihood expression (see Equation (12)) where h is an arbitrary constant defining a probability level set contour.

$$\frac{\left(T^j - \frac{\theta_c}{\kappa_c} - \frac{\theta_d}{\kappa_d}\right)^2}{\sigma^{j2}} = \left(\frac{\theta_c}{\kappa_c}\right)^2 + \left(\frac{\theta_d}{\kappa_d}\right)^2 - 2T^j\frac{\theta_c}{\kappa_c} - 2T^j\frac{\theta_d}{\kappa_d} + 2\frac{\theta_c}{\kappa_c}\frac{\theta_d}{\kappa_d} + T^{j2}$$

$$= h \quad (12)$$

The determinant is zero which suggests the likelihood function is actually a (degenerate) parabola (in fact, a line) rather than an ellipse. Therefore, the likelihood function does not represent a bivariate Gaussian distribution. This distribution is referred to as a Gaussian tube, as it is uniform along the major axis and Gaussian across its minor axis (see FIG. 3A). Intuitively, this is because after only one observation, there is no information to distinguish which of the resource requirements contributed, and how much was contributed, to the time it took to execute the task.

2.2.1 First Update

At the time of a job submission, no internal information about the job is received. Therefore, there is no prior belief about the requirements of the job's tasks. An uninformative prior is assumed. Therefore, the posterior distribution is just proportional to the likelihood. Similar to the likelihood function, the posterior of the parameter is just a noisy line or Gaussian cylinder in parameter space (Equation (13)).

$$p(\theta_c, \theta_d | T^j) = \frac{1}{\sqrt{2\pi}\,\sigma^j} \cdot \exp\frac{\left(T^j - \frac{\theta_c}{\kappa_c} - \frac{\theta_d}{\kappa_d}\right)^2}{2\sigma^{j2}} \quad (13)$$

Figure 3B:
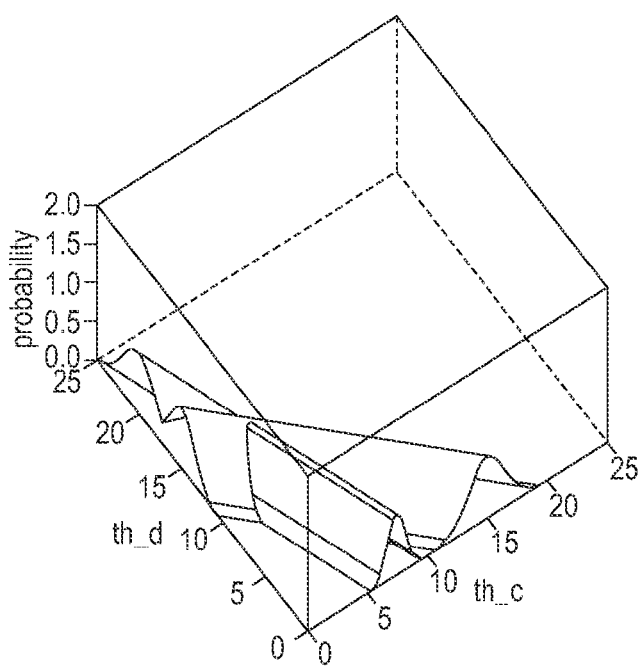
FIG. 3B illustrates prior and likelihood probability distributions describing possible combinations of computation and disk I/O that explain an observed execution time.

This implies that there is an infinite number of equally likely explanations for a single observation. This can be thought of as a linear set of equations with two variables but only one equation. A line in space is obtained no matter which server the task is run on, so the results of the first update, by themselves, are not sufficient to guide server selection. FIG. 3B illustrates a notional graphical example of the likelihood of FIG. 3A and the prior.

2.2.2 Second Update

Figure 3C:
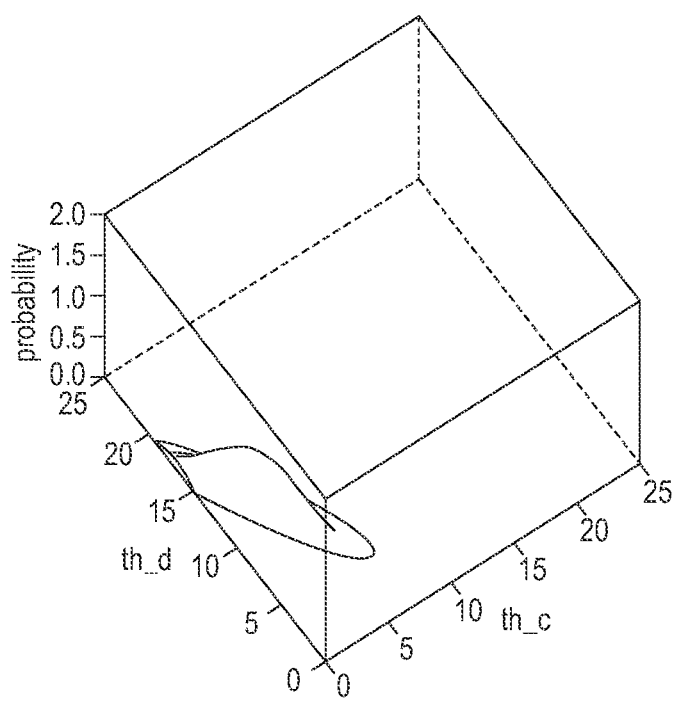
FIG. 3C illustrates a joint posterior between the prior and likelihood probability distributions of FIGS. 3A and 3B.

For the second update there is a prior distribution and likelihood function both in the form of Gaussian tubes. FIG. 3B illustrates a notional graphical example of the likelihood of FIG. 3A and the prior. These two are multiplied to obtain the density of the second posterior update. FIG. 3C illustrates a notional graphical example of the joint posterior between the prior and likelihood probability distributions of FIGS. 3A and 3B.

Let the first experiment be on machine j with capability $k^j$ and let the observed time be $T^j$ with variance $\sigma^j$. Let the second experiment be on machine k with capability $k^k$ and let the observed time be $T^k$ with variance $\sigma^k$. The resulting posterior distribution is:

$$p(\theta_c, \theta_d \mid T^j, T^k) = \frac{1}{z} \cdot \exp\left[\frac{\left(T^j - \frac{\theta_c}{\kappa_c^j} - \frac{\theta_d}{\kappa_d^j}\right)^2}{2\sigma^{j2}} + \frac{\left(T^k - \frac{\theta_c}{\kappa_c^k} - \frac{\theta_d}{\kappa_d^k}\right)^2}{2\sigma^{k2}}\right]. \tag{14}$$

where $z=\sqrt{2\pi}\sigma^j\sigma^k$. The posterior can be verified as a bivariate Gaussian by expanding the argument of the exponential in Equation (14) and collecting the $\theta$ terms.

$$\theta_c^2\left(\frac{1}{(\kappa_c^j\sigma^j)^2} + \frac{1}{(\kappa_c^k\sigma^k)^2}\right) + \theta_d^2\left(\frac{1}{(\kappa_d^j\sigma^j)^2} + \frac{1}{(\kappa_d^k\sigma^k)^2}\right) - \tag{15}$$

$$2\theta_c\left(\frac{T^j}{\kappa_c^j\sigma^j} + \frac{T^k}{\kappa_c^k\sigma^k}\right) - 2\theta_d\left(\frac{T^j}{\kappa_d^j\sigma^j} + \frac{T^k}{\kappa_d^k\sigma^k}\right) +$$

$$2\theta_c\theta_d\left(\frac{1}{\kappa_c^j\kappa_d^j\sigma^{j2}} + \frac{1}{\kappa_c^k\kappa_d^k\sigma^{k2}}\right) + \frac{T^{j2}}{\sigma^{j2}} + \frac{T^{k2}}{\sigma^{k2}} = h$$

When the determinant $\Delta$ is negative there is an ellipse.

$$\Delta = -\frac{4}{(\sigma^j\sigma^k)^2}\left(\frac{1}{\kappa_c^j\kappa_d^k} - \frac{1}{\kappa_d^j\kappa_c^k}\right)^2 \tag{16}$$

The determinant $\Delta$ can only be non-negative if $$\frac{\kappa_c^j}{\kappa_d^j} = \frac{\kappa_c^k}{\kappa_d^k},$$

in which case it is zero and the tubes are parallel. Hence, as long as machines with different capability ratios $$\frac{\kappa_c}{\kappa_d}$$

are chosen, the intersection is an ellipse and the distribution bivariate normal. In higher dimensions, the dot product of the normals of the planes representing possible solutions can be checked to test for parallelism.

The mean $\mu_{\theta_c,\theta_d}$ and covariance matrix $\Sigma_{\theta_c,\theta_d}$ of the bivariate Gaussian distribution can be recovered by identifying the origin and the rotation of the ellipse, as well as the length of its major and minor axes. Equation (15) is rewritten in standard form replacing the leading expressions of terms involving $\theta_c$ and $\theta_d$ with simple coefficients $a_{nm}$:

$$a_{20}\theta_c^2 + a_{10}\theta_c + a_{11}\theta_c\theta_d + a_{01}\theta_d + a_{02}\theta_d^2 + a_{00} = 0. \tag{17}$$

A well-known decomposition relation allows the mean and the inverse covariance matrix to be read off.

$$\begin{bmatrix} \mu_{\theta_c} \\ \mu_{\theta_d} \end{bmatrix} = \begin{bmatrix} \frac{a_{11}a_{01} - 2a_{02}a_{10}}{4a_{20}a_{02} - a_{11}^2} \\ \frac{a_{11}a_{10} - 2a_{20}a_{01}}{4a_{20}a_{02} - a_{11}^2} \end{bmatrix} \tag{18}$$

$$\sum_{\theta_c,\theta_d}^{-1} = \begin{bmatrix} a_{20} & \frac{1}{2}a_{11} \\ \frac{1}{2}a_{11} & a_{02} \end{bmatrix} \tag{19}$$

Notice that the terms involving the observation $T^j$ in the expanded form in Equation (15), which were replaced by coefficients $a_{10}$, $a_{01}$ and $a_{00}$ in Equation (18), do not appear in the covariance matrix. The covariance matrix is therefore independent of the observations $T^j$ and $T^k$. Therefore, the covariance matrix can be derived for a posterior distribution without actually running tasks on the servers. This implies that the experimental schedule can be pre-computed offline.

2.2.3 Third And Further Updates

For the third update, the prior will be a bivariate normal and the likelihood function a Gaussian tube. The general form of a bivariate normal distribution is:

$$p(\theta_c, \theta_d) = \frac{1}{2\pi\sqrt{|\Sigma_\theta|}} \exp\left(-\frac{(\theta - \mu_\theta)^T \sum_\theta^{-1} (\theta - \mu_\theta)}{2}\right). \tag{20}$$

Here, $\mu_\theta$ is the vector of means $\mu_{\theta_c}$ and $\mu_{\theta_d}$. $\Sigma_\theta$ is the general form of covariance matrix which includes individual variances $\sigma_{\theta_c}$ and $\sigma_{\theta_d}$ and the correlation coefficient $\rho$. The same likelihood distribution is used as used in Equation (11). Given the prior and likelihood, the posterior can be derived as follows:

$$p(\theta_c, \theta_d \mid T^j) = \tag{21}$$

$$\frac{1}{(2\pi)^{\frac{3}{2}}|\Sigma_\theta|^{\frac{1}{2}}\sigma^j} \exp\left[\left(-\frac{1}{2}(\theta - \mu_\theta)^T \sum_{\theta_i}^{-1}(\theta - \mu_{\theta_i})\right) - \frac{\left(T^j - \frac{\theta_c}{\kappa_c^j} - \frac{\theta_d}{\kappa_d^j}\right)^2}{2\sigma^{j2}}\right].$$

To determine the family of the above distribution, the mean vector and covariance matrix are substituted and then the expanded form of the distribution is derived, as follows.

$$\frac{1}{1-\rho^2}\left[\frac{(\theta_c - \mu_{\theta_c})^2}{\sigma_{\theta_2}^2} + \frac{(\theta_d - \mu_{\theta_d})^2}{\sigma_{\theta_d}^2} - \frac{2\rho(\theta_c - \mu_{\theta_c})(\theta_d - \mu_{\theta_d})}{\sigma_{\theta_c}\sigma_{\theta_d}}\right] + \tag{22}$$

$$\frac{\left(T^j - \frac{\theta_c}{\kappa_c^j} - \frac{\theta_d}{\kappa_d^j}\right)^2}{2\sigma^{j2}} =$$

$$\theta_c^2\left(\frac{1}{(\kappa_c^j\sigma^j)^2} + \frac{1}{\sigma_{\theta_c}^2(1-\rho^2)}\right) + \theta_d^2\left(\frac{1}{(\kappa_d^j\sigma^j)^2} + \frac{1}{\sigma_{\theta_d}^2(1-\rho^2)}\right) -$$

$$2\theta_c\left(\frac{T^j}{\kappa_c^j\sigma^j} + \frac{\mu_{\theta_c}}{\sigma_{\theta_c}^2(1-\rho^2)} - \frac{\rho\mu_{\theta_d}}{\sigma_{\theta_c}\sigma_{\theta_d}(1-\rho^2)}\right) -$$

-continued $$2\theta_d\left(\frac{T^j}{\kappa_d^j \sigma^j} + \frac{\mu_{\theta_d}}{\sigma_{\theta_d}^2(1-\rho^2)} - \frac{\rho\mu_{\theta_c}}{\sigma_{\theta_c}\sigma_{\theta_d}(1-\rho^2)}\right) +$$

$$2\theta_c\theta_d\left(\frac{1}{\kappa_c^j\kappa_d^j\sigma^{j2}} + \frac{\rho}{\sigma_{\theta_c}\sigma_{\theta_d}(1-\rho^2)}\right) + \frac{T^{j2}}{\sigma^{j2}} +$$

$$\frac{\mu_{\theta_c}^2}{\sigma_{\theta_c}^2(1-\rho^2)} + \frac{\mu_{\theta_d}^2}{\sigma_{\theta_d}^2(1-\rho^2)} - \frac{2\rho\mu_{\theta_d}\mu_{\theta_c}}{\sigma_{\theta_c}\sigma_{\theta_d}(1-\rho^2)} = h$$

As in the previous section, it can be shown that the determinant of the result is negative for servers with non-identical capability ratios and that the resulting family is an (elliptical) bivariate normal in that case. Therefore, a state with a closed form that can be updated repeatedly is reached.

2.3 Mutual Information Computation

As shown above, a posterior distribution can be computed over task parameters given an observation of the execution time of a task on a server. A determination must be made as to which server should execute the task to maximize information gain. In the previous section, it was noted that the expected information gain for the next experiment can be computed as the mutual information between the distribution of the task requirements $\theta$ and the observed time sample $T^j$. The mutual information is simply the difference in entropy $H(\theta)-H(\theta|T^j)$ (compare to Equation (5)).

The entropy of a multivariate Gaussian distribution is proportional to the determinant of the covariance matrix (see Thomas M. Cover and Joy A. Thomas. *Elements of information theory*. Wiley-Interscience, New York, N.Y., USA, 1991). Therefore the entropy of the prior is:

$$H(\theta) = \frac{\ln 2\pi e |\Sigma_\theta|}{2}, \quad (23)$$

where $|\Sigma_\theta|$ is the covariance of the prior. The entropy of the posterior $p(\theta,T^j)$ is:

$$-\int_\theta p(\theta, T^j)\ln p(\theta, T^j) d\theta = \frac{\ln 2\pi e |\Sigma_{\theta|T^j}|}{2}. \quad (24)$$

Applying Equation (24) to the definition of conditional entropy (Equation (6)) yields:

$$H(\theta|T^j) = \int_{T^j} p(T^j)\left(\frac{\ln 2\pi e |\Sigma_{\theta|T^j}|}{2}\right) dT^j, \quad (25)$$

where $|\Sigma_{\theta|T^j}|$ denotes the determinant of the covariance matrix of the posterior distribution.

In the previous section, it was shown that the covariance matrix of the posterior distribution is independent of the observation $T^j$ and is therefore constant with respect to the integration in Equation (25). Then, all that remains in the integral is the prior, which integrates to one. This leaves the covariance term:

$$H(\theta|T^j) = \frac{1}{2}\ln 2\pi e |\Sigma_{\theta|T^j}|. \quad (26)$$

2.3.1 First Experiment

It is assumed that there is no prior knowledge about the task profile. The variance and entropy of the prior distribution are therefore unbounded: $H(\theta)=|\Sigma_\theta|=\infty$. The posterior distribution after the first update has a linear tubular form. The overall variance and entropy are therefore still undefined: $|\Sigma_{\theta|T^j}|=H(\theta|T^j)=\infty$. The information gain $H(\theta)-H(\theta|T^j)$ is therefore undefined. Therefore, the first observation, by itself does not independently give information about which server to run the task on first.

2.3.2 Second Experiment

After the second update, assuming experimentation on two machines j, k, whose ratios of capabilities $$\frac{\kappa_c^j}{\kappa_d^j}, \frac{\kappa_c^k}{\kappa_d^k}$$

are distinct, the updated posterior follows a non-degenerate bivariate Gaussian distribution. At the beginning of the second experiment, the prior is still undefined and therefore $H(\theta)=\infty$. Hence, the information gain $H(\theta)-H(\theta|T^j)$ will be maximized by minimizing the conditional entropy $H(\theta|T^j)$. As shown in Equation (26), the entropy is driven by the determinant of the covariance matrix. This determinant can be derived using the inverse covariance matrix $|\Sigma^{-1}|$.

$$|\Sigma| = \frac{1}{|\Sigma^{-1}|} \quad (27)$$

$$|\Sigma^{-1}| = -\frac{\Delta}{4} \quad (28)$$

From Equation (16) the expression for $\Delta$ can be substituted in.

$$H(\theta|T^j) = \ln 2\pi e\left(-\frac{4}{\Delta}\right) = -\ln\left[\frac{1}{2\pi e}\frac{1}{(\sigma^j\sigma^k)^2}\left(\frac{1}{\kappa_c^j\kappa_d^k} - \frac{1}{\kappa_c^k\kappa_d^j}\right)^2\right] \quad (29)$$

Therefore, the posterior entropy $H(\theta|T^j)$ can be minimized by maximizing the squared term in the discriminant in Equation (29). This term will be maximized when the difference of fractions is maximized. The difference is maximized when one is large and the other is small. Note that the denominator of each fraction consists of one term from each server, but different dimensions. The pattern that maximizes this is to maximize the difference between servers on each dimension (e.g., one server with a fast CPU and slow disk and the other with a slow CPU and fast disk).

2.3.3 Third and Subsequent Experiments

The total information gain of a series of experiments 1,2, . . . ,m can be expressed as:

$$I(\theta;T^1,T^2,\ldots,T^{1:k+1},T^m,K)=\Sigma_{k=1}^{m-1}H(\theta|T^{1:k})-H(\theta|T^{1:k+1})=H(\theta)-H(\theta|T^{1:m}). \quad (30)$$

As shown, the series telescopes as internal terms cancel. To maximize the information gain, the second term (i.e., the entropy of the posterior distribution conditioned on all experiments) needs to be maximized.

This can be evaluated using a method similar to the previous section. The entropy is obtained indirectly from the discriminant. The general form of the discriminant for three or more observations has a regular form. The entropy of the posterior conditioned on all experiments has one term for each possible pairing of servers.

$$H(\theta | T^{j:1:m}) = \ln 2\pi e\left(-\frac{4}{\Delta}\right) = -\ln\left[\frac{1}{2\pi e}\sum_{j\neq k}\frac{1}{(\sigma^j\sigma^k)^2}\left(\frac{1}{\kappa_c^k\kappa_d^k} - \frac{1}{\kappa_c^k\kappa_d^j}\right)^2\right] \quad (31)$$

This is going to be minimized when each of the squares is maximized. As in the previous case, the squares will be maximized when the machines parameter's in each pair are most dissimilar. This result does not depend on the observations, so the sequence of experiments can be planned before execution time.

2.4 Conclusion

The above results can be used to construct a schedule of task assignments to servers that maximizes information gain. This schedule depends only on the capability parameters of the available servers and can hence be computed offline before any experiments and/or tasks are executed. This schedule can be used to explore and/or exploit tradeoffs. As discussed in more detail hereafter, in the context of a utility function over possible job executions (e.g., maximizing job throughput on the cluster globally), these results can be used to implement a decision-theoretic solution for scheduling in MapReduce. Such a solution would generate a schedule that would first learn job resource profiles to the extent that this information can be used to more efficiently execute subsequent tasks of a job, and then exploit this information to optimize the schedule.

While uninformative priors for task requirements were assumed, prior information from similar tasks or other sources can be employed. Further, the used task model explains execution time as a linear function of task requirements and server capabilities. Performance with respect to bounded resources, such as memory, however, will be non-linear. Using non-linear component models $f_k$ would allow the capture of performance with a model of the form $T^{i,j} \sim N(\Sigma_k f_k(\theta^i, k^j), \Sigma)$. These models are difficult to analyze, but could be analyzed by principled approximations.

Even more, it has been assumed that server performance is stationary. If server performance is allowed to be an estimated parameter, suboptimal performance issues could be diagnosed using a similar model. This is particularly relevant for HADOOP systems on cloud infrastructure and other uses of virtual machines where performance can be less predictable and many aspects of the system state are hidden and need to be diagnosed and/or inferred from observations.

3.0 Application

Figure 4:
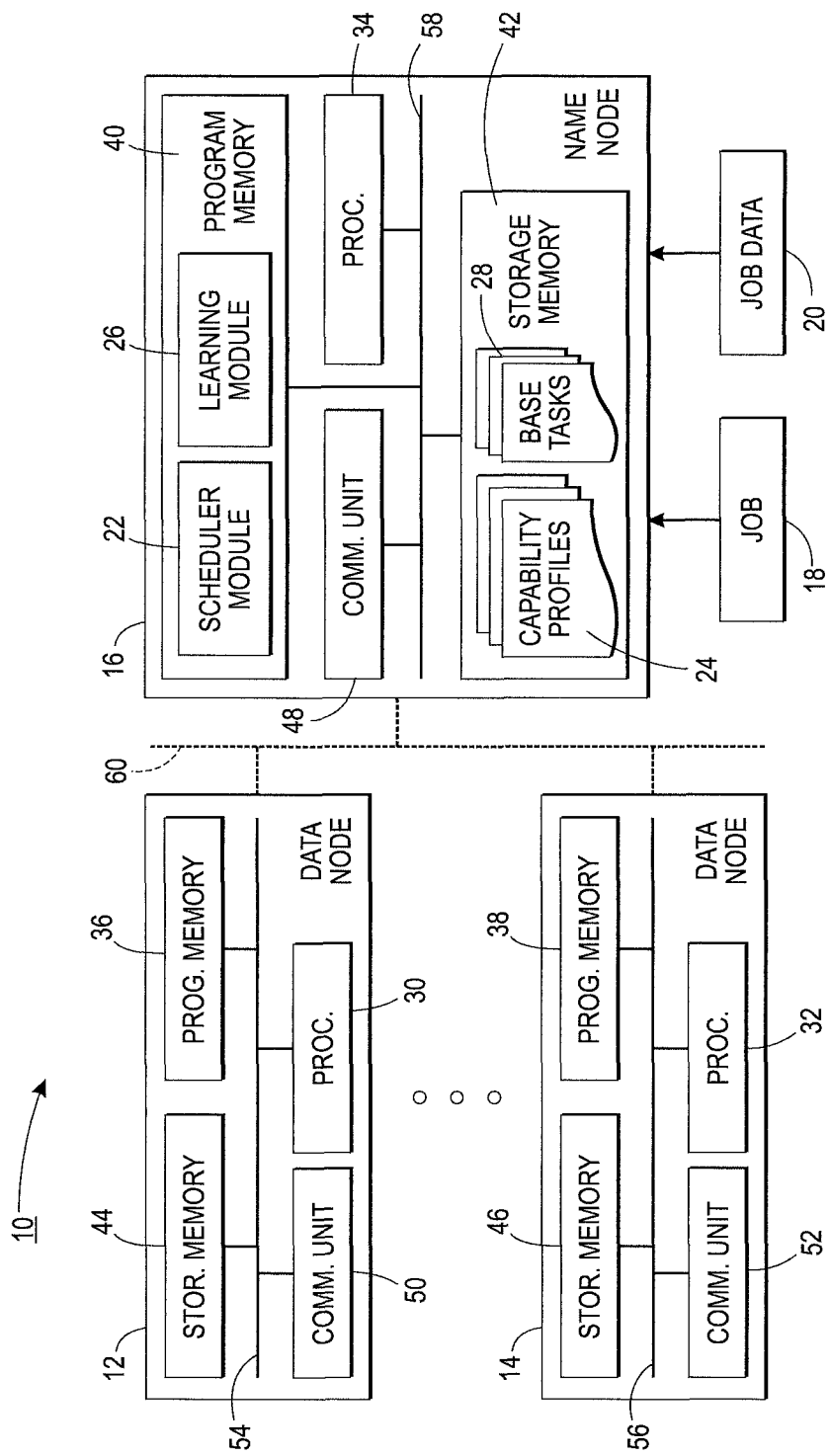
FIG. 4 illustrates a distributed compute system for executing data processing jobs.

With reference to FIG. 4, a distributed compute system 10 for executing data processing jobs is provided. The system 10 includes a plurality of compute nodes 12, 14, 16 (i.e., servers) interconnected by a communication network 60. The compute nodes 12, 14, 16 define a map-reduce cluster and include a name node 16 and a plurality of data nodes 12, 14. Suitably, the compute nodes 12, 14, 16 are heterogeneous in that the compute nodes 12, 14, 16 include compute nodes with different capabilities (e.g., disk I/O speed, CPU speed, etc.).

The name node 16 is configured to receive a job 18 to be performed by the plurality of data nodes 12, 14 and job data 20 to be processed through performance of the job 18. The job 18 and job data 20 can be, for example, received remotely (e.g., over a communications network) or locally (e.g., from a program running on the name node 16). The job 18 is a program configured to work within the map-reduce framework of the system 10. In that regard, the program can, for example, include map and reduce functions performed by the map and reduce tasks, respectively. Typically, the map and reduce functions operate at the level of a record or a line of text. The map function of the well-known WordCount program, for example, counts occurrences of words in lines of text.

The name node 16 breaks the job data 20 into blocks (e.g., 64 megabytes (MBs)), or otherwise receives the job data 20 as blocks, and stores the blocks of the job data 20. In some embodiments, the job data 20 is stored in a distributed file system (e.g., a Hadoop Distributed File System (HDFS)) spanning the data nodes 12, 14. Further, in some embodiments, where the job data 20 is stored in a distributed file system, each block is stored on a predetermined number (e.g., three) of the data nodes 12, 14. See, for example, FIG. 1.

Figure 2:
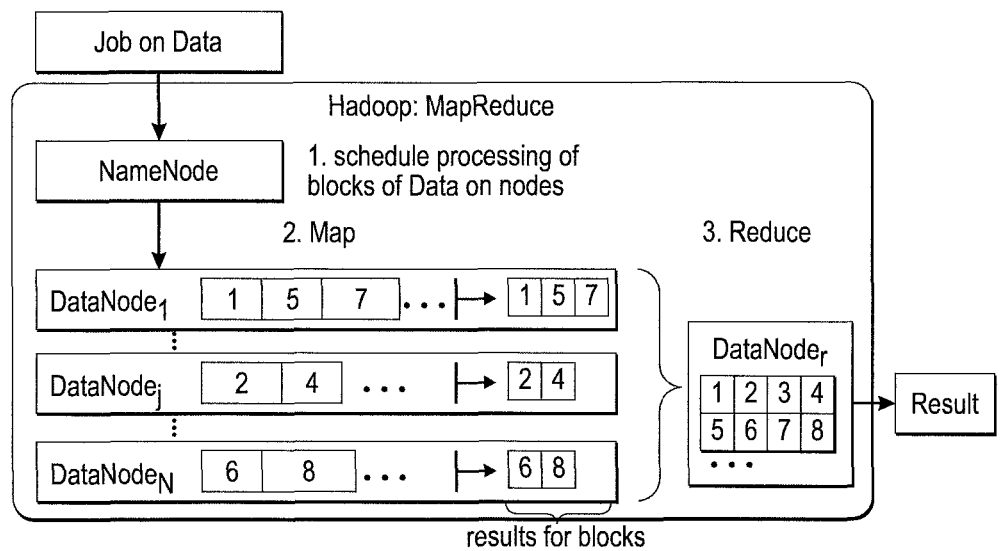
FIG. 2 illustrates an example implementation of a map-reduce framework known as HADOOP.

The name node 16 further breaks the job 18 into a plurality of map and reduce tasks, or otherwise receives the job 18 broken into map and reduce tasks, and schedules execution of the tasks on the data nodes 12, 14. See, for example, FIG. 2. Each map task operates on a different block of the job data 20, where the map tasks of the job 18 collectively operate on all of the blocks of the job data 20. In some embodiments, where the job data 20 is stored in a distributed file system, each map task is assigned to one of the data nodes 12, 14 storing its respective block. In this way, blocks will not to be transferred amongst the data nodes 12, 14. A map task processes a data block and generates a result for this block. A reduce task takes all these intermediate mapping results and combines them into the final result of the job 18.

To schedule the tasks of the job 18 onto the data nodes 12, 14, the name node 16 includes a scheduler module 22. The scheduler module 22 generates a schedule for executing the tasks which accounts for heterogeneity in the cluster and maximizes overall job throughput. This requires the scheduler module 22 to track available resources, which can be determined based on capability profiles 24 of the data nodes 12, 14. Namely, available resources can be determined by tracking those data nodes which are not being used and using the corresponding capability profiles.

The capability profiles 24 of the data nodes 12, 14 are determined before using the data nodes 12, 14 in production using a learning module 26. For example, before using the cluster, the capability profiles of all the data nodes in the cluster are determined. Thereafter, capability profiles are determined as needed as new data nodes are added to the cluster. The capability profile of a data node describes the capability of the data node. For example, the capability profile of a data node describes one or more of the CPU, memory, disk storage, software configuration, and the like of the data node.

Figure 5:
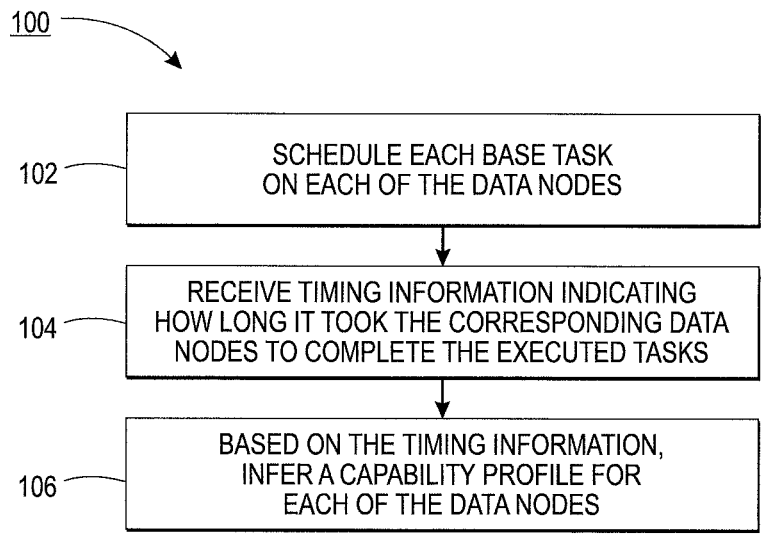
FIG. 5 illustrates a method for generating capability profiles of data nodes.

The capability profiles 24 can be manually or automatically generated. Automatic generation is suitably performed using the learning module 26, which can, for example, perform the method 100 of FIG. 5. The method 100 assumes the availability of the following: 1) timing information from task executions for the data nodes 12, 14; 2) a set of base tasks 28 with various, known resource requirements (e.g., requirements pertaining to one or more of the CPU, memory, disk storage, software configuration, and the like); and 3) control over the scheduling of tasks onto the compute nodes 12, 14. Timing information for task executions includes the amount of time to complete each task execution (i.e., execution of task on a data node).

The method 100 includes scheduling 102 execution of each base task 28 on each of the data nodes 12, 14 and receiving 104 timing information for each execution. After executing the base tasks 28, the relative time it took each of the data nodes 12, 14 to finish each of the base tasks 28 is compared to infer 106 a capability profile for each of the data nodes 12, 14. Namely, given the resource requirements of each of the base tasks 28, the method 100 infers the relative, resource specific performance characteristics of each of the data nodes 12, 14 using the timing information. Intuitively, after running all the base tasks 28 on all the data nodes 12, 14, it is known how well suited each of the data node 12, 14 is for various kinds of tasks. For instance, the timing information will show that certain data nodes are faster for tasks that require a lot of disk access (e.g., perhaps because these data nodes have very new and fast disks). Likewise, the time to completion of other jobs will mainly depend on the speed of a compute node's CPU.

Figure 6:
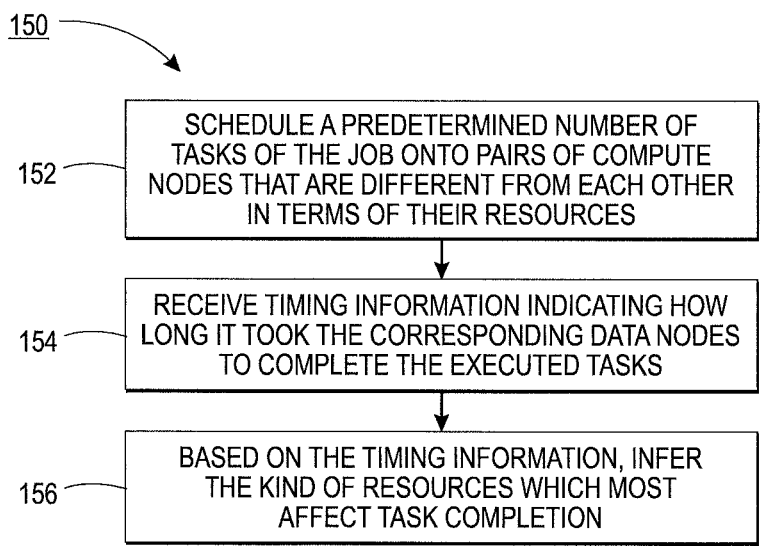
FIG. 6 illustrates a method for generating resource requirement profiles of jobs.

Assuming the capability profiles 24 of the data nodes 12, 14 are available, the scheduler module 22 initially generates a resource requirement profile for the job 18 using the learning module 26. The resource requirement profile of the job 18 is determined during execution of the job 18 using ideas from pervasive diagnosis according to the method 150 of FIG. 6. See Lukas Kuhn, Bob Price, Johan De Kleer, Minh Do, and Rong Zhou. 2008. Pervasive diagnosis: the integration of diagnostic goals into production plans. In *Proceedings of the 23rd national conference on Artificial intelligence—Volume* 3 (AAAI '08), Anthony Cohn (Ed.), Vol. 3. AAAI Press 1306-1312, for more information regarding pervasive diagnosis. A resource requirement profile for a job describes the compute resources (e.g., one or more of the CPU, memory, disk storage, software configuration, and the like) required to perform the job.

The method 150 includes scheduling 152 a predetermined number (e.g., three) of tasks of the job 18 onto pairs of data nodes that are substantially different from each other in terms of their resources (e.g., CPU speed compared to disk speed). After the predetermined number of tasks are executed, timing information indicating how long it took the corresponding data nodes to complete the tasks is received 154.

Based on the timing information, the method 150 infers 156 the kind of resources which most affect task completion (i.e., what the resource requirements of the job 18 are). For instance, to determine the relative disk-performance requirements of the job 18, the method 150, intuitively, schedules tasks to be executed on two data nodes that are similar with respect to all of their resources, but differ in terms of their disk performance. If the execution times of the tasks on these two data nodes differ substantially, the method 150 infers that the job 18 depends on good disk performance. The magnitude of the difference of task completion provides a measure for the extent of dependence on disk performance. Similarly, the dependence of the job 18 on other resources can be determined.

The specifics of determining resource requirement profiles of jobs are described above in connection with Sections 1 and 2. Within these sections, a Bayesian experimental design that maximizes the information gained about task requirements is provided. The experimental design results in a schedule of servers to execute a task to maximize information. Further, within these sections, a model of the expected time a task will take to complete on a specific data node in the cluster, based on its resource requirements and the data nodes capabilities, is provided. This model is used to implement a Bayesian update to perform learning of job resource requirements.

In some embodiments, the resource requirement profile is evaluated using a metric of how well the resource profile has been learnt. If the metric does not fall within a predetermined range, additional timing information is gathered for additional tasks and the inferred resource requirement profile is updated with the additional timing information. This is repeated until the metric falls within a predetermined range (e.g., the metric indicates the level of knowledge of the resource requirement profile exceeds a threshold).

After the resource requirement profile of the job 18 is determined, the scheduler module 22 schedules the remaining tasks of the job 18. Namely, the scheduler module 22 matches job requirements with available resources. Job requirements and available resources are based on the capability profiles 24 of the data nodes 12, 14 and the resource requirement profile of the job 18. For example, the tasks of the job are preferentially assigned to data nodes with fast CPUs (as determined from the capability profiles 24) if the resource requirement profile of the job 18 indicates the job 18 is highly dependent upon CPU speed.

Figure 7:
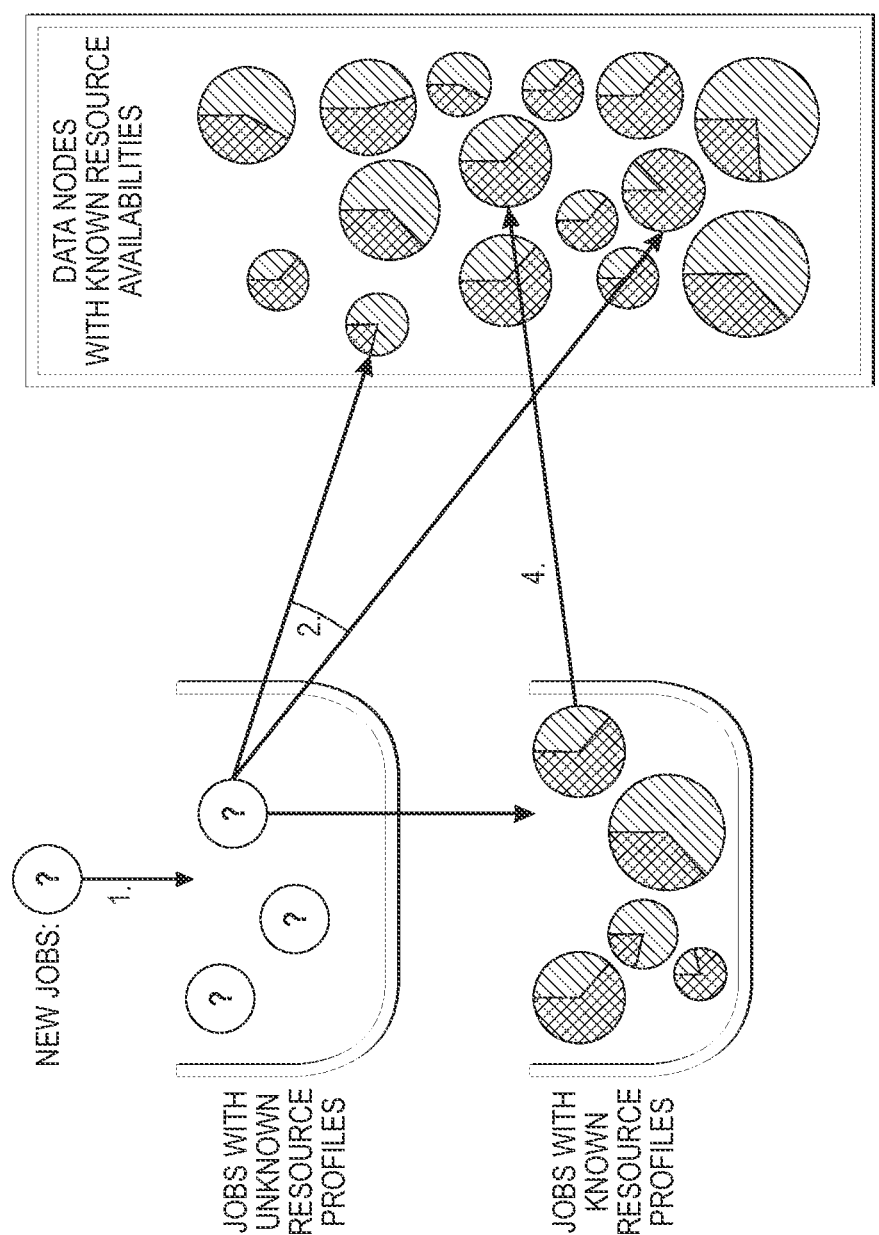
FIG. 7 illustrates the scheduling of jobs in a map-reduce cluster.

Referring to FIG. 7, the above described approach to scheduling jobs is illustrated. Once the capability profiles 24 of the data nodes 12, 14 are known, they can be exploited to: a) learn resource profiles for new, unknown jobs (steps 1, 2, and 3); and b) to optimally schedule jobs with known resource profiles onto the data nodes 12, 14 (step 4). Any newly submitted job is first put into a first bucket with all the other jobs whose resource requirements profiles are yet unknown (step 1). The scheduling module 22, using the learning module 26, intelligently schedules tasks belonging to these jobs onto pairs of data nodes that are different from each other in terms of their resources (step 2). The data nodes 12, 14 are shown as pie charts with each slice indicating a resource (e.g., CPU) and the proportion of slices indicating the proportion of resources. The sizes of the pie charts also indicate the extent of the overall capabilities of the data nodes 12, 14.

Based on the observed time to completion, the resource profile of a job is inferred. Once a sufficient level of knowledge is achieved, the job is transferred to a second bucket of jobs whose profiles are known (step 3). Level of knowledge is assessed using a metric of how well the resource profile has been learnt, and a sufficient level of knowledge is a level of knowledge exceeding a predetermined threshold. Similar to the data nodes 12, 14, these jobs are shown as pie charts with each slice indicating a resource requirement and the proportion of slices indicating the proportion of resource requirements. The sizes of the pie charts also indicate the extent of the overall resource requirements. Jobs in this second bucket are scheduled onto the data nodes 12, 14 according to the required resources (step 4), optimally utilizing available resources on each data node, by better match making with resource requirements of jobs.

Referring back to FIG. 4, in some embodiments, the scheduler module 22 generates a report indicating what kind of new resource acquisitions would most increase the overall throughput of the cluster. This can be based on a historical analysis of the resource requirements of past jobs. For example, if the majority of jobs processed by the cluster are disk I/O intensive, nodes with fast disks would most improve the throughput of the cluster.

Further, in some embodiments, the scheduler module 22 compares the actual run time of a task to an expected run time of the task to detect intermittent problems (e.g., slow-downs) with the data nodes 12, 14. The expected run time can be determined using the capability profiles 24 of the data nodes 12, 14 and the resource requirements profile of the task using a model relating the capability profiles 24 with the resource requirement profile. A notification or report can be generated indicating determined problems.

The compute nodes 12, 14, 16 are computers and each include one or more processors 30, 32, 34, one or more program memories 36, 38, 40, one or more storage memories 42, 44, 46, and one or more communications units 48, 50, 52. The program memories 36, 38, 40 include processor executable instructions executed by the processors 30, 32, 34 to carry out the above described functionality. For example, the program memory 40 of the name node 16 includes the scheduling module 22 and the learning module 26. The storage memories 42, 44, 46 typically store the respective data blocks of the data nodes 12, 14, 16. The communications units 48, 50, 52 allow the processors 30, 32, 34 to communicate with external systems and/or devices of the corresponding data nodes 12, 14, 16, for example, over the communications network 60. One or more system buses 54, 56, 58 interconnect the processors 30, 32, 34, the program memories 36, 38, 40, the storage memories 42, 44, 46, and the communications units 48, 50, 52.

In view of the forgoing, the system 10: a) learns about the dynamic state of the compute nodes 12, 14, 16 in the cluster and, for example, detects intermittent problems, such as slow-downs; and b) is able to passively and fully automatically identify the specific resource requirements of new, unseen jobs being processed on the cluster. Combining these two sources of information (i.e., dynamic state of compute resources, and resource requirements of jobs), the scheduler module 22 is able to better schedule tasks belonging to jobs onto the compute nodes that have the most appropriate hard—and software configuration for their needs. This approach is particularly beneficial on heterogeneous clusters, where the compute nodes can have vastly different hard—and software configurations.

While the system 10 was described as using a map-reduce framework, it is to be appreciated that it can be applied to other frameworks for processing jobs in which the jobs are broken down into tasks with approximately uniform resource requirement profiles. Further, it is to be appreciated that the approach for inferring resource requirements of jobs has broader applicability than task scheduling.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), an FPGA, and the like; a user input device includes one or more of a mouse, a keyboard, a touch screen display, one or more buttons, one or more switches, one or more toggles, voice recognition engines, and the like; a database includes one or more memories; a display device includes one or more of a LCD display, an LED display, a plasma display, a projection display, a touch screen display, and the like; and a communication network includes a local area network (LAN), a wide area network (WAN), a virtual private network (VPN), the Internet, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for scheduling jobs in a cluster of compute nodes, said system comprising:
    at least one processor programmed to:
        receive a job with an unknown resource requirement profile, the job including a plurality of tasks;
        wherein the resource requirement profile for the job includes the following compute resources:
        central processing unit (CPU) usage;
        disk input/output (I/O) usage; and
        memory usage;
    wherein the at least one processor is further programed to:
        infer a compute resource that most affects task completion by:
            determining a magnitude of an extent of dependence on CPU usage by scheduling tasks of the plurality of tasks on a first two compute nodes of the plurality of compute nodes that are similar with respect to disk I/O usage and memory usage but differ with respect to CPU usage, and receiving timing information regarding execution time of the scheduled tasks including an amount of time to complete execution of a task on the first two compute nodes;
            determining a magnitude of an extent of dependence on disk I/O usage by scheduling tasks of the plurality of tasks on a second two compute nodes of the plurality of compute nodes that are similar with respect to CPU usage and memory usage but differ with respect to disk I/O usage, and receiving timing information regarding execution time of the scheduled tasks including an amount of time to complete execution of a task on the second two compute nodes; and
            determining a magnitude of an extent of dependence on memory usage by scheduling tasks of the plurality of tasks on a third two compute nodes of the plurality of compute nodes that are similar with respect to CPU usage and disk I/O usage but differ with respect to memory usage, and receiving timing information regarding execution time of the scheduled tasks including an amount of time to complete execution of a task on the third two compute nodes;
        wherein the processor is further programmed to schedule execution of remaining tasks of the job on the compute nodes of the cluster using the resource requirement profile based on the compute resource that most affects task completion.

2. The system according to claim 1, wherein the plurality of tasks share a common resource requirement profile.

3. The system according to claim 1, wherein the at least one processor is further programmed to:
    match the resource requirement profile of the job to capability profiles of the compute nodes of the cluster to schedule execution of the remaining tasks of the job on the compute nodes of the cluster.

4. The system according to claim 1, wherein the at least one processor is further programmed to:
infer the resource requirement profile for the job using a Bayesian experimental design.

5. The system according to claim 1, wherein that at least one processor is further programmed to:
schedule execution of base tasks on the compute nodes, wherein the base tasks are different than the plurality of tasks;
receive timing information regarding execution time of the scheduled base tasks including an amount of time to complete execution of a base task; and
infer capability profiles for the compute nodes based on the received timing information regarding the base tasks.

6. The system according to the claim 5, wherein the base tasks have known resource requirement profiles.

7. The system according to claim 5, wherein the at least one processor is further programmed to:
schedule execution of each of the base tasks on each of the compute nodes.

8. The system according to claim 5, wherein the at least one processor is further programmed to:
infer capability profiles for the compute nodes before scheduling execution of the some of the plurality of tasks.

9. The system according to claim 5, wherein the at least one processor is further programmed to:
compare the relative time it took each of the compute nodes to finish each of the base tasks to infer the relative capability profiles for the compute nodes.

10. The system according to claim 1, wherein the job utilizes a map-reduce framework.

11. The system according to claim 1, wherein the at least one processor is further programmed to:
determine a metric indicative of how well the resource requirement profile was inferred; and
if the metric does not fall within a predetermined range, gather additional timing information regarding execution time of the scheduled tasks including an amount of time to complete execution of a task, and update the resource requirement profile with the additional timing information.

12. A method for scheduling jobs in a cluster of compute nodes, said method performed by at least one processor and comprising:
receiving a job with an unknown resource requirement profile, the job including a plurality of tasks;
scheduling execution of some of the plurality of tasks on compute nodes of the cluster with differing capability profiles; and
receiving timing information regarding execution time of the scheduled tasks including an amount of time to complete execution of a task;
wherein the resource requirement profile for the job includes the following compute resources:
central processing unit (CPU) usage;
disk input/output (I/O) usage; and
memory usage;
wherein the method further incudes inferring a compute resource that most affects task completion by:
determining a magnitude of an extent of dependence on CPU usage by scheduling tasks of the plurality of tasks on a first two compute nodes of the plurality of compute nodes that are similar with respect to disk I/O usage and memory usage but differ with respect to CPU usage, and receiving timing information regarding execution time of the scheduled tasks including an amount of time to complete execution of a task on the first two compute nodes;
determining a magnitude of an extent of dependence on disk I/O usage by scheduling tasks of the plurality of tasks on a second two compute nodes of the plurality of compute nodes that are similar with respect to CPU usage and memory usage but differ with respect to disk I/O usage, and receiving timing information regarding execution time of the scheduled tasks including an amount of time to complete execution of a task on the second two compute nodes; and
determining a magnitude of an extent of dependence on memory usage by scheduling tasks of the plurality of tasks on a third two compute nodes of the plurality of compute nodes that are similar with respect to CPU usage and disk I/O usage but differ with respect to memory usage, and receiving timing information regarding execution time of the scheduled tasks including an amount of time to complete execution of a task on the third two compute nodes; and
wherein the method further includes scheduling execution of the remaining tasks of the job on the compute nodes using the resource requirement profile based on the compute resource that most affects task completion.

13. The method according to claim 12, wherein the plurality of tasks share a common resource requirement profile.

14. The method according to claim 12, further including:
matching the resource requirement profile of the job to capability profiles of the compute nodes of the cluster to schedule execution of the remaining tasks of the job on the compute nodes of the cluster.

15. The method according to claim 12, further including:
inferring the resource requirement profile for the job using a Bayesian experimental design.

16. The method according to claim 12, further including:
scheduling execution of base tasks on the compute nodes, wherein the base tasks are different than the plurality of tasks;
receiving timing information regarding execution time of the scheduled base tasks including an amount of time to complete execution of a base task; and
before scheduling execution of the some of the plurality of tasks, inferring capability profiles for the compute nodes based on the received timing information regarding the base tasks.

17. The method according to the claim 16, wherein the base tasks have known resource requirement profiles.

18. The method according to claim 16, further including:
comparing the relative time it took each of the compute nodes to finish each of the base tasks to infer the capability profiles for the compute nodes.

19. A map-reduce system for executing jobs, said system comprising:
a plurality of interconnected compute nodes defining a cluster, the plurality of interconnected compute nodes includes a name node and a plurality of data nodes, the name node configured to:
receive a job with an unknown resource requirement profile, the job including a plurality of tasks;
schedule execution of some of the plurality of tasks on data nodes of the cluster with differing capability profiles; and receive timing information regarding execution time of the scheduled tasks including an amount of time to complete execution of a task;
wherein the resource requirement profile for the job includes the following compute resources:
central processing unit (CPU) usage;
disk input/output (I/O) usage; and
memory usage;
wherein the name node is further configured to:
infer a compute resource that most affects task completion by:
determining a magnitude of an extent of dependence on CPU usage by scheduling tasks of the plurality of tasks on a first two data nodes of the plurality of data nodes that are similar with respect to disk I/O usage and memory usage but differ with respect to CPU usage, and receiving timing information regarding execution time of the scheduled tasks including an amount of time to complete execution of a task on the first two data nodes;
determining a magnitude of an extent of dependence on disk I/O usage by scheduling tasks of the plurality of tasks on a second two data nodes of the plurality of data nodes that are similar with respect to CPU usage and memory usage but differ with respect to disk I/O usage, and receiving timing information regarding execution time of the scheduled tasks including an amount of time to complete execution of a task on the second two data nodes; and
determining a magnitude of an extent of dependence on memory usage by scheduling tasks of the plurality of tasks on a third two data nodes of the plurality of data nodes that are similar with respect to CPU usage and disk I/O usage but differ with respect to memory usage, and receiving timing information regarding execution time of the scheduled tasks including an amount of time to complete execution of a task on the third two data nodes; and
wherein the name node is further configured to schedule execution of the remaining tasks of the job on the data nodes using the resource requirement profile based on a compute resource that most affects task completion.

20. The map-reduce system of claim 19, wherein the name node is further configured to schedule the execution of the some of the plurality of tasks on data nodes of the cluster with differing capability profiles with a predetermined number of tasks of the plurality of tasks on pairs of data nodes that are substantially different from each other in terms of their resources.

21. The map-reduce system of claim 20, wherein the predetermined number is three.

22. A method for scheduling jobs in a cluster of compute nodes, said method performed by at least one processor and comprising:
receiving a job with an unknown resource requirement profile, the job including a plurality of tasks;
scheduling execution of some of the plurality of tasks on compute nodes of the cluster with differing capability profiles;
receiving timing information regarding execution time of the scheduled tasks including an amount of time to complete execution of a task;
inferring a resource requirement profile for the job based on the received timing information and the differing capability profiles; and
scheduling execution of remaining tasks of the job on the compute nodes of the cluster using the resource requirement profile;
wherein the resource requirement profile for the job includes the following compute resources:
central processing unit (CPU) usage;
disk input/output (I/O) usage; and
memory usage;
wherein the scheduling is based on a compute resource that most affects task completion;
wherein the method further includes:
determining a metric indicative of how well the resource requirement profile was inferred; and
in response to the metric not being within a predetermined range, gathering additional timing information regarding execution time of the scheduled tasks including an amount of time to complete execution of a task, and updating the resource requirement profile with the additional timing information.

23. A map-reduce system for executing jobs, said system comprising:
a plurality of interconnected compute nodes defining a cluster, the plurality of interconnected compute nodes includes a name node and a plurality of data nodes, the name node configured to:
receive a job with an unknown resource requirement profile, the job including a plurality of tasks;
schedule execution of some of the plurality of tasks on data nodes of the cluster with differing capability profiles;
receive timing information regarding execution time of the scheduled tasks including an amount of time to complete execution of a task;
infer a resource requirement profile for the job based on the received timing information and the differing capability profiles; and
schedule execution of remaining tasks of the job on the data nodes of the cluster using the resource requirement profile;
wherein the resource requirement profile for the job includes the following compute resources:
central processing unit (CPU) usage;
disk input/output (I/O) usage; and
memory usage;
wherein the scheduling is based on a compute resource that most affects task completion; and
wherein the name node is further configured to:
determine a metric indicative of how well the resource requirement profile was inferred; and
if the metric does not fall within a predetermined range, gather additional timing information regarding execution time of the scheduled tasks including an amount of time to complete execution of a task, and update the resource requirement profile with the additional timing information.

* * * * *